(No Model.)
D. McCARTY.
PUMPKIN SEED PLANTER.
No. 386,643. Patented July 24, 1888.
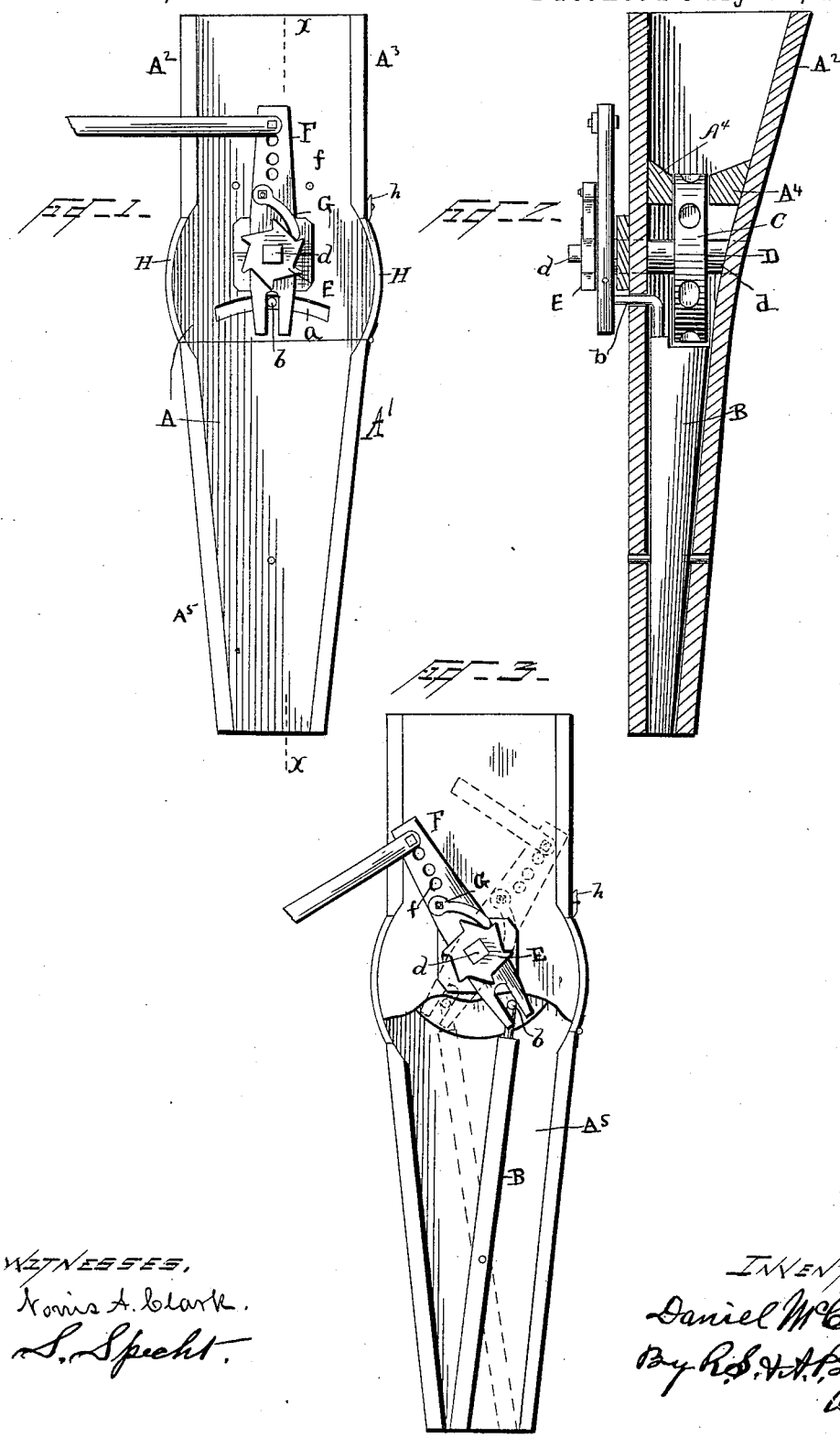

UNITED STATES PATENT OFFICE.

DANIEL McCARTY, OF INDEPENDENCE, IOWA.

PUMPKIN-SEED PLANTER.

SPECIFICATION forming part of Letters Patent No. 386,643, dated July 24, 1888.

Application filed March 31, 1888. Serial No. 269,086. (No model.)

*To all whom it may concern:*

Be it known that I, DANIEL McCARTY, a citizen of the United States, residing at Independence, in the county of Buchanan and State of Iowa, have invented certain new and useful Improvements in Pumpkin-Seed Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to pumpkin-seed planters, and has for its object the provision of an attachment that can be adjusted to any planter or other agricultural implement for dropping seed at regular intervals, which intervals can be adjusted and varied at will.

The improvement consists in having the hopper and the grain-spout formed so that one will be an extension of the other, the sides of the hopper converging and forming the sides of the grain or delivery spout. The grain-wheel is operated by a ratchet-wheel keyed on an extension of its journal and a lever mounted on the said journal and free to oscillate thereon, and having a pawl that engages with the ratchet-wheel. This lever is adapted to be connected at one end with any moving part of the machine, and its other end is adapted to engage with an arm that extends from a cut-off or flirt valve pivoted in the grain-spout, said arm projecting through a curved slot in the side of the grain-spout. The grain-wheel and the said cut-off or flirt valve are operated simultaneously. The narrow sides of the grain-spout are bulged opposite the grain-wheel and are closed in by curved plates, one or both of which may be hinged.

The improvement further consists of the details of construction which hereinafter will be more fully described and claimed, and shown in the annexed drawings, in which—

Figure 1 is a side view of the planter attachment; Fig. 2, a vertical section on the line X X of Fig. 1; Fig. 3, a detail side view, parts being broken away, showing the operation of the lever and the cut-off or flirt valve by dotted lines.

The hopper is composed of the sides A, A', A², and A³, and the bottom formed of the two curved blocks A⁴, between which the grain-wheel C is arranged, the upper surface of the blocks conforming to and the blocks being flush at their inner edges with the grain-wheel and inclining upwardly toward their outer edges to direct the grain onto the grain-wheel and prevent any lodgment of the grain in the hopper. The sides A and A' are extended below the blocks A⁴ to form the sides of the grain or delivery spout, and these extensions are closed in by the side pieces A⁵, thus completing the spout.

The cut-off or flirt valve B is pivoted midway of its ends between the sides A and A' of the grain-spout, and is provided with the arm b, which is bent at right angles and extends through the curved slot a in the side A.

The grain-wheel D, having a series of pockets in its periphery, is journaled between the sides A and A', and has the journal d extended beyond the side A, and provided with the ratchet-wheel E, that is keyed thereon. The lever F, mounted on the journal d and free to vibrate thereon, has its upper end provided with a series of openings, f, and its lower end bifurcated and embracing the arm b. The pawl G, carried by the lever F and engaging with the ratchet-wheel E, moves the said wheel forward when the lever is actuated.

The attachment is adapted to be applied to any planter or agricultural implement, and the lever F is connected with any suitable moving part of the machine that will actuate it. Now, when the lever is vibrated, the pawl G will engage with the ratchet-wheel E and rotate the grain-wheel, and at the same time will vibrate the cut-off or flirt valve B. When the lever is carried back, the pawl rides over the ratchet-wheel, and when moved forward the pawl engages with and actuates the ratchet-wheel. The cut-off or flirt valve is operated at each movement of the lever, and releases the grain when the lever is moving back, and retains the grain in the grain-spout when the lever is moving forward.

The edges of the sides A and A' bulge or expand opposite the grain-wheel, and are closed by the curved plates H. One of these plates is hinged at its lower edge and is held closed by the turn-buckle h.

Having thus described my invention, what I claim, and desire to secure by Letters Patent, is—

1. The herein-described planter attachment, composed of the hopper, having its sides A and A' extended and closed at their edges by the pieces $A^5$, the grain-wheel, the curved blocks having their upper edges beveled, the curved plates H, one being hinged and held closed by a turn-buckle or other catch, the cut-off or flirt valve pivoted between its ends, and having an arm that extends through a curved slot in the side A, the ratchet-wheel keyed on a journal of the grain-wheel, the lever mounted on the said journal, and having its lower end extended and engaging with the said arm of the cut-off or flirt valve, and the pawl carried by the lever and adapted to engage with the ratchet-wheel, substantially as and for the purpose specified.

2. The combination, with the hopper, the grain-spout, and the grain-wheel, of the pivoted cut-off or flirt valve, having an arm, the ratchet-wheel keyed on the journal of the grain-wheel, the lever mounted loosely on the said journal, and having a series of openings at its upper end, and having its lower end extended and bifurcated to embrace the said arm, and the pawl carried by the said lever, substantially as described.

In testimony whereof I affix my signature in presence of two witnesses.

DANIEL McCARTY.

Witnesses:
A. C. SIMMONS,
D. S. DEERING.